United States Patent [19]

Murata

[11] Patent Number: 5,355,231
[45] Date of Patent: Oct. 11, 1994

[54] OUTPUT APPARATUS WITH DOT DENSITY ADJUSTMENTS

[75] Inventor: Masahiko Murata, Tama, Japan

[73] Assignee: Canon Kabushiki Kaisha, Tokyo, Japan

[21] Appl. No.: 974,347

[22] Filed: Nov. 10, 1992

Related U.S. Application Data

[63] Continuation of Ser. No. 493,324, Mar. 14, 1990, abandoned.

[30] Foreign Application Priority Data

Mar. 15, 1989 [JP] Japan .................................. 1-61023
Mar. 15, 1989 [JP] Japan .................................. 1-61024

[51] Int. Cl.$^5$ ............................................. H04N 1/40
[52] U.S. Cl. ................................... 358/443; 358/296; 358/448; 358/444
[58] Field of Search ............... 358/443, 444, 451, 448, 358/296, 298, 469, 459, 429, 401, 400; 395/112, 110, 500

[56] References Cited

U.S. PATENT DOCUMENTS

| | | | |
|---|---|---|---|
| 3,964,591 | 6/1976 | Hill et al. ............................ | 197/1 R |
| 4,210,057 | 7/1980 | Göring et al. ....................... | 411/37 |
| 4,675,743 | 6/1987 | Riseman et al. .................... | 358/467 |
| 4,860,119 | 8/1989 | Maniwa et al. ..................... | 358/296 |
| 4,926,347 | 5/1990 | Uchida et al. ...................... | 395/112 |
| 4,968,159 | 11/1990 | Sasaki et al. ...................... | 395/112 |
| 5,050,098 | 9/1991 | Brown, III et al. ................. | 395/112 |
| 5,075,874 | 12/1991 | Steeves et al. ..................... | 395/112 |
| 5,088,033 | 2/1992 | Binkley et al. ..................... | 395/500 |
| 5,093,903 | 3/1992 | Sudoh et al. ....................... | 395/110 |
| 5,131,078 | 7/1992 | Ikenoue .............................. | 395/112 |
| 5,137,379 | 8/1992 | Ukai et al. .......................... | 395/110 |
| 5,179,690 | 1/1993 | Ishikawa ............................ | 395/112 |

FOREIGN PATENT DOCUMENTS

| | | |
|---|---|---|
| 0173285 | 3/1986 | European Pat. Off. . |
| 0198255 | 10/1986 | European Pat. Off. . |
| 354791 | 2/1990 | European Pat. Off. . |
| 2625432 | 12/1976 | Fed. Rep. of Germany . |
| 2645432 | 4/1978 | Fed. Rep. of Germany . |
| 3242919 | 11/1981 | Fed. Rep. of Germany . |
| 3635979 | 10/1985 | Fed. Rep. of Germany . |
| 2182471 | 5/1987 | United Kingdom . |

*Primary Examiner*—Mark R. Powell
*Assistant Examiner*—Fan Lee
*Attorney, Agent, or Firm*—Fitzpatrick, Cella, Harper & Scinto

[57] ABSTRACT

An output apparatus for receiving code information, developing it into a bit map and recording it, in which the code information is developed into image information of a bit pattern form the image information is recorded on a recording medium and an image which is formed on the recording medium can be recorded while a dot density of the image is changed, and a the dot density is changed for use by the recording means in correspondence to the code system designated by the code information. The printing dot density is automatically changed to the dot density corresponding to the print control program such as an emulation program or the like, so that characters of different fonts such as English and Japanese can be automatically printed at the optimum printing dot densities.

85 Claims, 5 Drawing Sheets

|   | 0 | 1 | 2 | 3 | 4 | 5 | 6 | 7 |
|---|---|---|---|---|---|---|---|---|
| 0 | NUL |   | SP | 0 | @ | P |   | p |
| 1 |   |   | ! | 1 | A | Q | a | q |
| 2 |   |   | " | 2 | B | R | b | r |
| 3 | EXT |   | # | 3 | C | S | c | s |
| 4 |   |   | ı | ı | ı | ı | ı | ı |
| 5 |   |   | ı | ı | ı | ı | ı | ı |
| 6 |   |   | ı | ı | ı | ı | ı | ı |
| 7 | BEL |   | ı | ı | ı | ı | ı | ı |
| 8 | BS |   | ı | ı | ı | ı | ı | ı |
| 9 | HT |   | ı | ı | ı | ı | ı | ı |
| A | LF |   | ı | ı | ı | ı | ı | ı |
| B | VT | ESC | ı | ı | ı | ı | ı | ı |
| C | FF |   | ı | ı | ı | ı | ı | ı |
| D | CR |   | ı | ı | ı | ı | ı | ı |
| E | SO | RS | ı | ı | ı | ı | ı | ı |
| F | SI | VS | ı | ı | ı | ı | ı | ı |

OUTPUT APPARATUS WITH DOT DENSITY ADJUSTMENTS

This application is a continuation of application Ser. No. 07/493,324, filed Mar. 14, 1990 now abandoned.

BACKGROUND OF THE INVENTION

1. Field of the Invention

The present invention relates to an output apparatus for changing dot density of the and recording the data on into a recording medium.

2. Related Background Art

Hitherto, as font pattern data which is output to a printer, a plurality of kinds of font patterns are provided so as to cope with various character types, and when a character code to be printed is input, the font pattern corresponding to the designated character is read out of a font memory and printed. In such a printer, the density of dots to be printed is generally set to a fixed value.

Among the above font patterns, in the case of pattern data for English or other European languages, in which the number of character types is small, they are formed so as to be printed with high quality by printing by using a printer of a high print dot density. On the contrary, in case of pattern data for Japanese in which Chinese characters (Kanji) or the like are printed, since the number of characters is large, they are set so as to be recorded at a relatively low resolution because of a limitation in the capacity of the font ROM.

Therefore, to print both of English or other European languages and Japanese by means of the conventional printer, since the dot density of the printer is constant, it is necessary to provide completely separate printers for use only in Japanese or in English and other European languages, respectively.

There are various application programs for print using such printers. In those programs, a special printer control code is generated through a host computer, and printing is executed. In such a printing apparatus, printing by other control codes is realized by a control program, that is, an emulation program for printing by means of such other control codes of the printing apparatus different from the inherent printer control code. Generally, since the emulation program is formed in correspondence to the recording dot density peculiar to the printing apparatus, the sizes or positions of output images will differ from the desired size or position in the application program depending on the difference in the recording dot densities of the printing apparatuses, so that there is a problem that normal printing cannot be executed.

SUMMARY OF THE INVENTION

In consideration of the above problems, an object of the present invention is attained in providing an output apparatus of a recording control apparatus for receiving code information, developing it into a bit map and recording it, comprising developing means for developing the code information into image information of a bit pattern form; recording means which can record the image information onto a recording medium and can record an image which is formed onto the recording medium while changing a dot density of the image; and changing means for changing the dot density of the recording means in correspondence to a code system which was designated by the code information.

In consideration of the above problems, it is another object of the invention is attained by providing an output apparatus of recording means in which code information is developed into image information of the bit pattern form, the image information is recorded onto a recording medium, and a dot density of an image which is formed onto the recording medium is changed and the image can be recorded, wherein the output apparatus operates so as to change the dot density of the recording means in correspondence to a code system designated by the code information.

The present invention is made in consideration of the above conventional example and it is still another object of the invention is attained by providing an output apparatus in which a recording dot density can be automatically changed to the recording dot density corresponding to a print control program such as an emulation program or the like.

In consideration of the above problems, still another object of the invention is attained has providing an output apparatus of a recording control apparatus for receiving code information, developing it into a bit map and recording it, comprising: developing means for developing the code information into image information of the bit pattern form; recording means which can receive the image information and record it onto a recording medium and can record an image which is formed onto the recording medium while changing a recording dot density of the image; and changing means for changing the recording dot density by the recording means in correspondence to a control program to execute the recording process by using the recording means.

In consideration of the above problems, still another object of the invention is attained by providing an output apparatus in which code information is developed into image information of a bit pattern form, the image information is input and recorded onto a recording medium, and an image which is formed on the recording medium can be recorded while changing a recording dot density of the image, wherein the recording dot density for recording on the recording medium can be changed in correspondence to a control program to execute the recording process.

DETAILED DESCRIPTION OF THE PREFERRED EMBODIMENTS

The preferred embodiment of the present invention will be described in detail hereinbelow with reference to the drawings.

Figure 1:
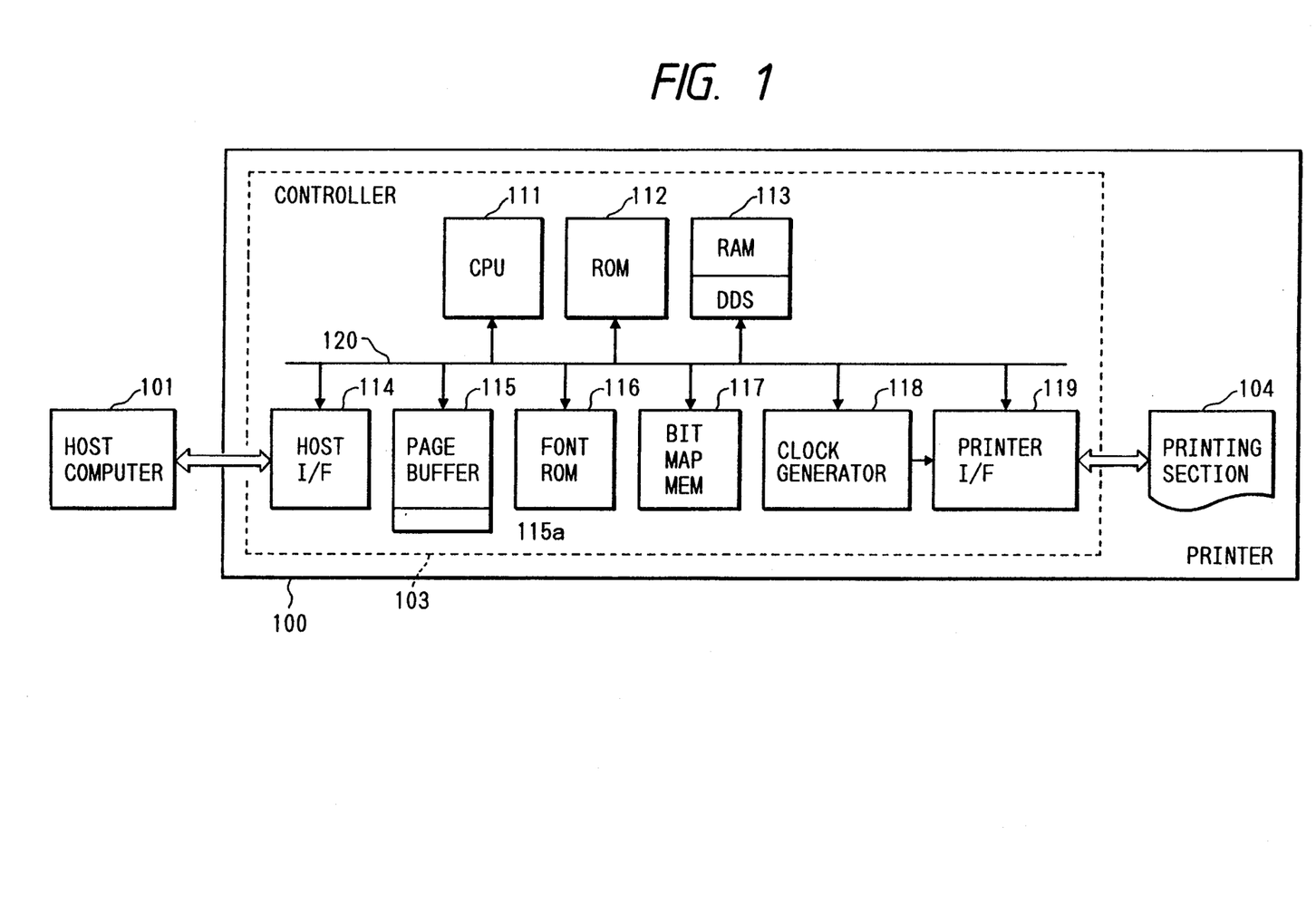
FIG. 1 is a block diagram showing a schematic construction of a printer of a first preferred embodiment of the invention.
Figure 2:
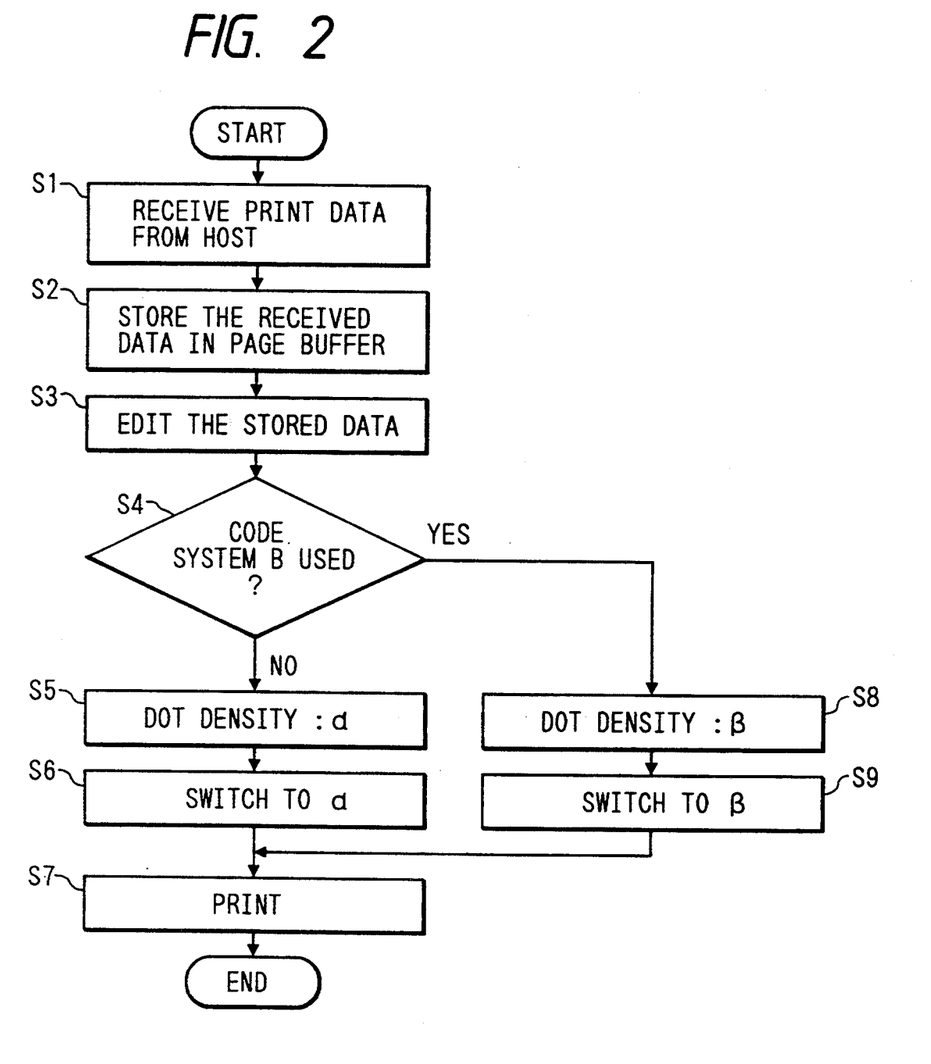
FIG. 2 is a flowchart showing printing processes in a printer in the FIG. 1 embodiment.

Description of a Printer (FIGS. 1 and 2)

FIG. 1 is a block diagram showing a schematic construction of a printer 100 of a first preferred embodiment of the invention.

Reference numeral 101 denotes a host computer. The host computer 101 outputs a character code and various control codes to the printer 100 of their embodiment and indicates the printing. The code which is output from the host computer 101 includes code information such as a character or the like, information to indicate the size (for example, a point number), type style, and the like.

A construction of the printer 100 will now be described.

Reference numeral 103 denotes a controller of the printer 100 and 104 indicates a printing section to actually execute the printing operation. The printing section 104 can print at a different dot density while changing the printing dot density by a command which is output from the controller 103. Reference numeral 111 denotes a CPU to control the whole printer 100. The CPU outputs various control signals onto a bus 120 in accordance with control programs (for instance, that illustrated in FIG. 2) stored in a ROM 112 and various kinds of data, thereby controlling each section, which will be explained hereinbelow. Reference numeral 112 denotes the program ROM in which the control programs of the CPU 111, various kinds of data, and the like are stored. Reference numeral 113 denotes a RAM which is used as a work area of the CPU 111. Various kinds of data are temporarily stored in the RAM 113. The present printing dot density in the printing section 104 is stored by, for instance, dpi (the number of dots per inch) in a DDS (Dot Density) memory area.

Reference numeral 114 denotes a host interface section the executing the input and output controls of various data between the host computer 101 and the printer 100. Reference numeral 115 indicates a page buffer to store input print data. The page buffer 115 is also used for a page edition, which will be explained hereinbelow. Reference numeral 116 denotes a font ROM to store dot pattern information in correspondence to character codes and the like. Reference numeral 117 denotes a bit map memory. Image information of at least one page developed into a bit map pattern with reference to the font ROM 116 on the basis of the character codes or the like stored in the page buffer 115 is stored in the bit map memory 117.

Reference numeral 119 indicates a printer interface section to control the interface between the printing section 104 and the CPU 111 or the like. Reference numeral 118 represents a clock generator to generate image clocks corresponding to the dot density in the printing section 104. The printer interface section 119 serially outputs print data to the printing section 104 synchronously with the image clocks. The printing section 104 corresponds to the recording section to actually execute the recording in the printer 100. A mechanism section and the like of the recording system are included in the recording section.

The operation in the above construction will now be described. When print data is sent from the host computer 101, it is input through the host interface section 114 and the fact that the data has been input is sent to the CPU 111. Thus, each time the data is received, the CPU 111 transfers the data to the page buffer 115 and stores it there. In parallel with the above process, the commands or data stored in the page buffer 115 are sequentially read out. In accordance with the command, the kind of character and the font, the number of characters, the character pitch, and the like to be selected are interpreted, and page editing is executed in an area 115a in the page buffer 115.

The code data read out of the area 115 is developed into a bit map by referring to the pattern data in the font ROM 116 and is developed as a pattern into the bit map memory 117. When print data of a predetermined amount, for instance, one page, is developed into a bit pattern, the image clocks which are generated from the clock generator 118 are set on the basis of the present dot density stored in the DDS memory area and the printing dot density is designated in the printing section 104. The bit pattern data is output to the printing section 104 and the image information which was developed into a dot pattern is printed.

When the dot density designating command is input to the printing section 104, the internal mode of the printing section 104 is set so as to change the printing dot density to the designated density. After that, the printing is performed at the designated printing dot density.

The printing control is executed in a manner such that the CPU 11 outputs a control signal to the printing section 104 through the printer interface section 119 and a signal is input/output to/from the printing section 104. When a horizontal sync signal is received from the printing section 104, the print data is sent as video data to the printing section 104 synchronously with the image clocks which are generated from the clock generator 118. The print data is transferred from the bit map memory 117 to the printer interface section 119. The printer interface section 119 converts the parallel data into the serial data and the video data is formed.

The fundamental outputting operation has been described above. Changing of dot density as a feature of this embodiment will now be described.

Particularly, as a general example, explanation will now be made with respect to the case where printing is executed while changing the printing dot density in accordance with the English and Japanese character code systems respectively.

It is now assumed that the character code system of English is set to A and the character code system of Japanese is set to B. Since the number of character fonts of the English character code system is small, the printing dot density is set to $\alpha$ (for instance, 300 dpi) and the printing is executed. In the case of the Japanese character code system, since the number of distinct characters such as Chinese characters or the like is large, the printing dot density is set to $\beta$ (for example, 240 dpi) and the printing is performed. The relation $\alpha > \beta$ obtains, and such a relation is general in such printing apparatus as have already been known.

In this embodiment, before the outputting operation to the printing section 104 mentioned above, the printing command or print data stored in the page buffer 115 is read out by the CPU 111. The page editing is executed in the page buffer 115a on the basis of the command. At this time, a check is made to see if the command to designate the character code system B, that is, the Japanese character code or the character code of Japanese, exists in the relevant page or not.

If the character code system B does not exist in the relevant page, an instruction is made to the printing section 104 so as to print at the printing dot density $\alpha$.

The character font, character pitch, and the like are selected so as to output a character at the character size designated by the command and at the dot density indicated and are developed into the bit map memory 117.

On the other hand, if the command to designate the code system B of Japanese or the character code of Japanese exists, in order to print with the printing dot density β, the character font and character pitch are selected so as to output the character at the size designated by the command and at the dot density β and are developed into the bit map memory 117. Upon printing, as mentioned above, the printing dot density of the printing section 104 is switched to the dot density α or β and the printing is executed.

FIG. 2 is a flowchart showing the printing processes in this embodiment. The control program to execute the printing processes is stored in the ROM 112.

In FIG. 2, steps S1 to S7 show one step in the printing of one page. If those processes can also be performed for data on another page as well as for data on the same page, the processes in the above steps can be also executed in parallel.

In step S1, the print data from the host computer 101 is received by the host interface section 114. In step S2, the data received in step S1 is stored in the page buffer 115. In step S3, the data in the page buffer 115 stored in step S2 is read out by the CPU 111, the command or data is interpreted and the page editing is executed. After completion of the editing of one page, step S4 follows and a check is made to see if the command to designate the character code system B (of Japanese) or the character code exists in the page or not. If the character code system B does not exist, step S5 follows. If YES, step S8 follows.

In step S5, in order to print at the dot density α, or in step S8, in order to print at the dot density β, the character dot data is developed into the bit map memory 117 so as to print at the size, character style, pitch, and font kind Which were requested by the command from the host computer 101 and at each dot density. At the same time, the value in the DDS memory area is also updated into the latest dot density.

In steps S6 and S9, the dot density is switched to the corresponding dot density α or β. Such process of switching the dot density is accomplished by changing the clock rate of the clock generator 118 or by outputting the dot density information to the printing section 104. In step S7, the printing dot density is output to the printing section 104 and the printing is performed.

As described above, in this embodiment, by discriminating the code system to be used on the basis of the printing command or print data or the like from the host computer 101, the English output and Japanese output can be automatically printed with different dot densities. A method of actually designating the character codes of English and Japanese will now be described.

Figure 3:
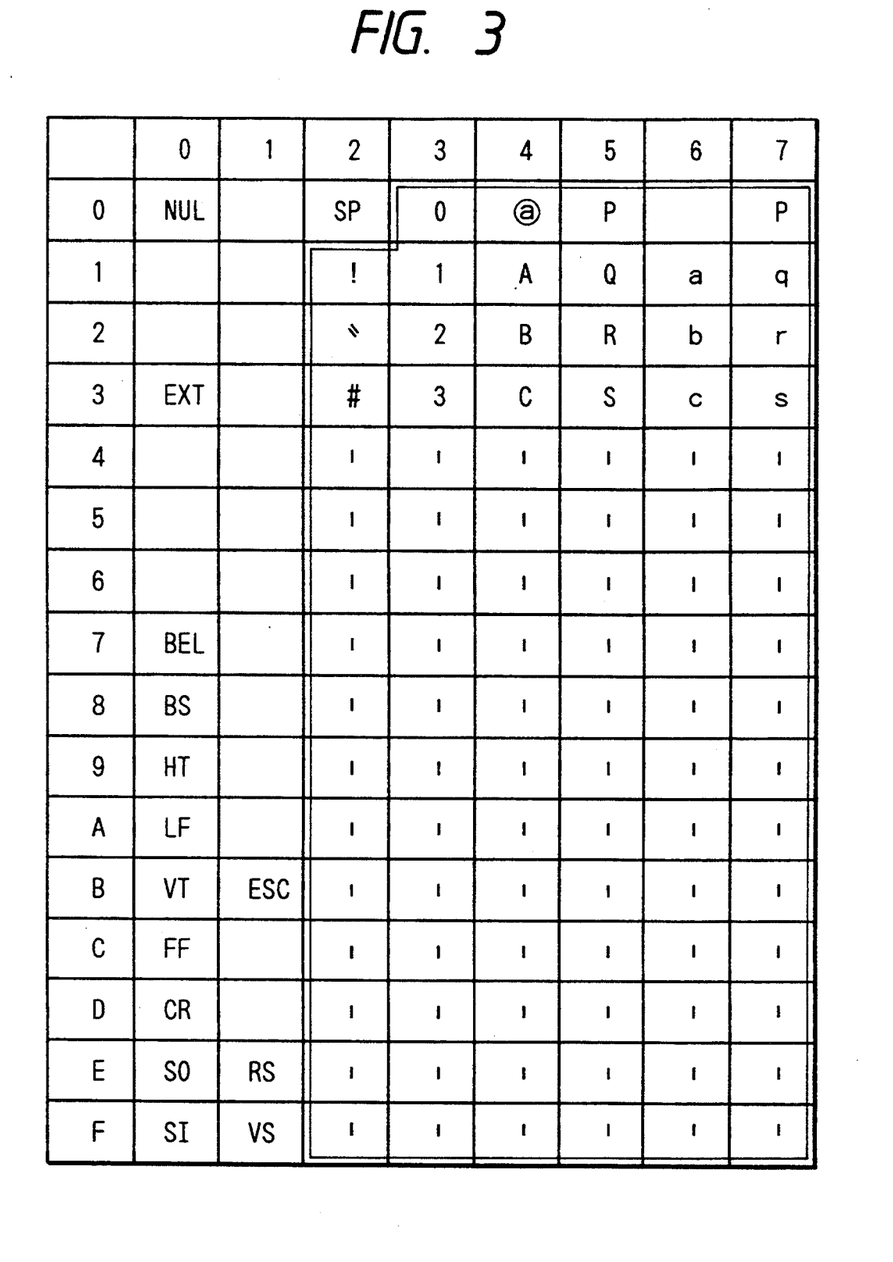
FIG. 3 is a diagram showing a code system of the ISO code.

FIG. 3 is a diagram showing the code system of the command system ISO.

In FIG. 3, the numerical values written in the the upper stage denote Values of upper three bits of the 7-bit code and the numerical values written at the left edge portion denote the lower four bits of the 7-bit code. On the other hand, in the diagram, the block in the bold frame denotes the character code system for each code and a few kinds of character code systems such as USA, JIS, and the like are provided. The numerical values written outside the bold frame indicate codes which are used for commands. The switching among the character code systems is indicated by the data subsequent to an escape command "ESC". The subsequent code which continues after the data is interpreted as whatever character code system was designated there. As the code systems, for instance, ASCII, UK, JIS, and the like can be mentioned.

In parallel with the above data, if data indicative of the 2-byte code continues after the "ESC" command, it is assumed that a Chinese character has been designated. The subsequent data is interpreted as a 2-byte code and the character code system B of Chinese character is selected.

As mentioned above, a check is made to see if the code system is set as a code system for English or Japanese, and the printing can be executed at the optimum printing dot density by the character code system which is included in the data from the host computer 101 in accordance with the designated code system for English or Japanese.

Another Embodiment

[I] the above embodiment, the printing dot density has been selected in dependence on the character system being English or Japanese and the printing has been executed at the selected density. However, the dot density can be also switched in accordance with the occupation ratio in one page. Or, those factors can also be distinguished by an arbitrary code system irrespective of the special character code system of English or Japanese. On the other hand, although the above embodiment has been described with respect to the case of characters, the invention is not limited to such a case. The invention can be also applied to the case of recording ordinary images, figures, or the like.

[II] In the above embodiment, the printing dot density has been switched between two kinds by the character code system. However, a few kinds of printing dot densities can be also distinguished by a few kinds of character code systems.

[III] In the above embodiment, the number of character system to be distinguished has been set to each one system. However, as a set of a few kinds of character code systems, the printing dot density can be also distinguished between groups of the character code systems.

In the above item [III], it is also possible to correspond to a few kinds of printing dot densities by a few groups.

In such embodiment, the printing dot density has been recognized on a page unit basis. However, it can be also discriminated on a unit basis of one job or a few jobs.

[IV] Although the explanation has been made for only the character codes, in addition to this, the printing dot density can be also switched and the printing is executed in accordance with the command system such as ISO, DIABLO, EBCDIC, shift JIS, or the like, the command system such as a VDM as a command system of the vector expression, the program of a page description language, or the like.

[V] Although the description has been made with respect to only the font of the dot construction, data can be also developed in the bit map memory by using an outline font of the vector expression.

For instance, in the case of a laser beam printer, the process of changing the dot density in the printing section can be realized by changing the period of image clocks, changing the scanning speed or scanning period of a laser beam, or changing the conveying speed (pitch) or the like of a recording paper. In the case of a serial printer or the like, the dot density change can be realized by changing the scanning pitch (speed) of a serial head and the conveying pitch of a recording paper.

As described above, according to the embodiment, there is an advantage that by automatically switching the printing dot density and printing in accordance with the command system or character code system in the print data, the printing can be performed at the necessary optimum printing dot density in correspondence to the characteristics of each character without the intervention of an operator.

On the other hand, the printing can be executed at the optimum dot density by using the character font of the conventional printing apparatus of a fixed printing dot density without changing the character font.

As described above, according to the invention, there is an advantage that the dot density upon recording can be changed to the optimum density in correspondence to the code system for recording.

A second preferred embodiment of the present invention will now be described in detail hereinbelow with reference to the drawings.

Figure 4:
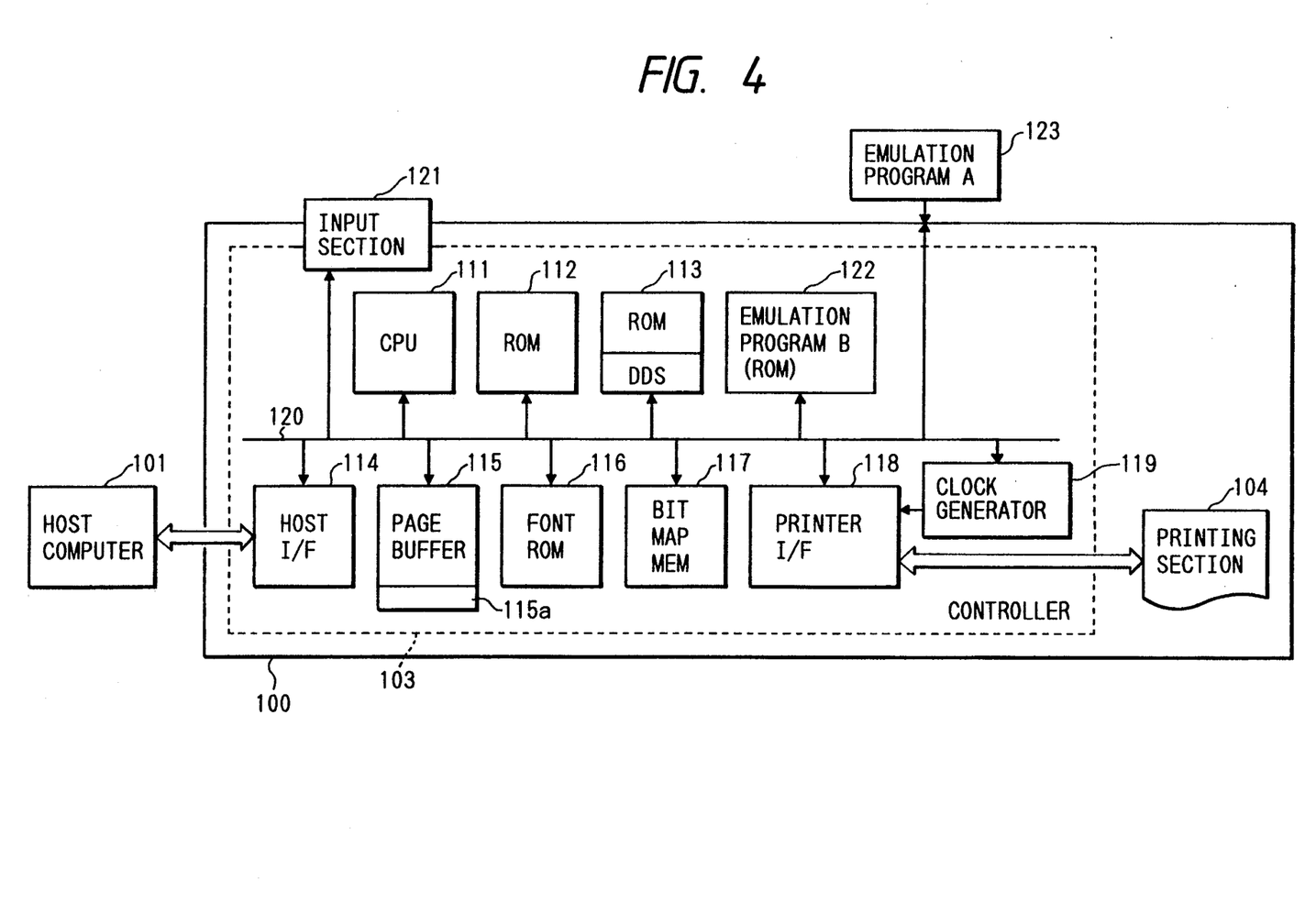
FIG. 4 is a block diagram showing a schematic construction of a printer of a second preferred embodiment.
Figure 5:
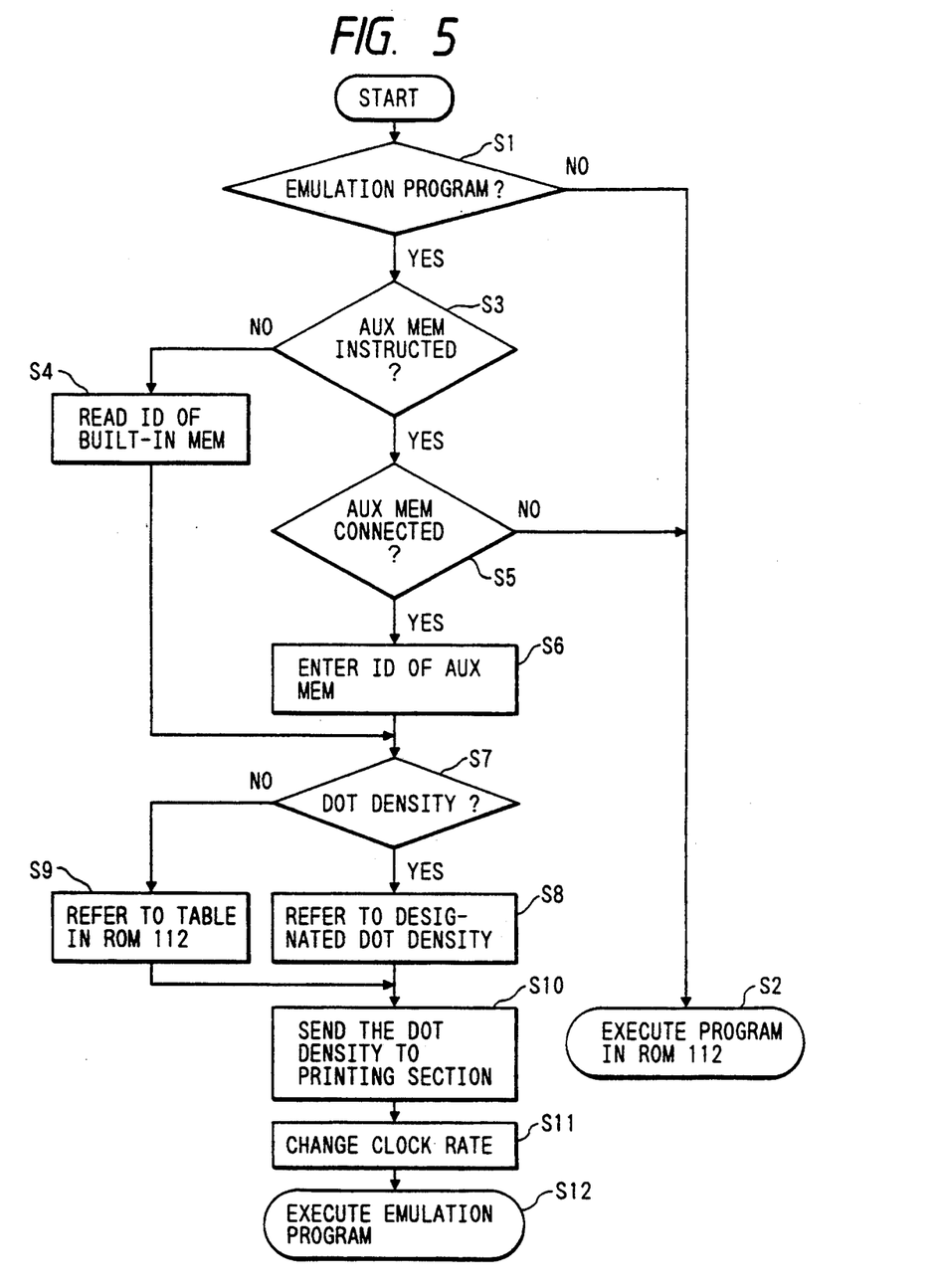
FIG. 5 is a flowchart showing printing processes in the printer of the FIG. 4 embodiment.

Description of the Printer (FIGS. 4 and 5)

FIG. 4 is a block diagram showing a schematic construction of the printer 100 in this embodiment, in which the same parts and components as those shown in FIG. 1 are designated by the same reference numerals.

Reference numeral 101 denotes a host computer for outputting character codes and various control codes to the printer 100 in the embodiment and instructing the printing. The code which is output from the host computer 101 includes the code information of character or the like, information to indicate the size (for instance, the point number), type style, and the like of such a character, and the like.

A construction of the printer 100 will be described hereinbelow.

Reference numeral 103 denotes the controller of the printer 100 and 104 indicates the printing section to actually execute the printing operation. The printing dot density can be changed by a command which is output from the controller 103 and the printing can be performed at a different dot density. Reference numeral 111 indicates the CPU to control the whole printer 100. The CPU 111 outputs various control signals onto the bus 120 and controls each section, which will be explained hereinbelow, in accordance with the control programs or various data stored in the ROM 112. Reference numeral 112 denotes the program ROM in which the control programs of the CPU 111 and various kinds of data and the like are stored. Reference numeral 113 indicates the RAM which is used as a work area of the CPU 111. The RAM 113 temporarily stores various data. The present printing dot density in the printing section 104 is stored in the DDS (Dot Density) memory area as a value of, for instance, dpi (the number of dots per inch).

Reference numeral 114 indicates the host interface section to execute the input/output control of various data between the host computer 101 and the printer 100. Reference numeral 115 represents the page buffer to store the input print data. The page buffer 115 is also used for page editing, which will be explained later. Reference numeral 116 indicates the font ROM to store dot pattern information corresponding to the character codes and the like. Reference numeral 117 denotes the bit map memory. The image information of at least one page which was developed into a bit map pattern with reference to the font ROM 116 on the basis of the character codes or the like stored in the page buffer 115 is stored in the bit map memory 117.

Reference numeral 119 denotes the printer interface section to control the interface between the printing section 104 and the controller 103. Reference numeral 118 denotes the clock generator to generate image clocks in correspondence to the dot density in the printing section 104. The printer interface section 119 serially outputs the print data to the printing section 104 synchronously with the image clocks. The printing section 104 corresponds to the recording section to actually execute the recording by the printer 100. A mechanism section and the like of the recording system are included in the recording section. A few kinds of dot densities can be set by an instruction from the controller 103 and the recording can be executed.

Reference numeral 121 denotes an input section. The operator can instruct through the inputting section 121 whether the program in the ROM 112 is to be executed or whatever either one of the emulation programs A and B is to be selected and executed or the like. Reference numeral 122 denotes a built-in ROM in which the emulation program B is stored; 123 indicates a detachable external connecting memory which is connected to the controller 103 by a connector or the like and in which the emulation program A is stored; and 120 the system bus to connect each section mentioned above as shown in the diagram and to transmit an address signal, a data signal, and various control signals.

The operation of the above construction will now be described. When print data is sent from the host computer 101, it is input through the host interface section 114. The fact that the data has been input is sent to the CPU 111. Due to this, each time the data is received, the CPU 111 transfers and stores the data in the page buffer 115. In parallel with the above processes, the commands or data stored in the page buffer 115 are sequentially read out, the kind of character and the font, the number of characters, the size of character, the interval, and the like to be selected are interpreted in accordance with the command, and page editing is executed in the area 115a in the page buffer 115 by a predetermined format.

The code data stored in the area 115a is developed into a bit map with reference to the pattern data in the font ROM 116 on the basis of the information of the printing position, pitch, type style, size, and the like. The bit map is developed as a bit map pattern in the bit map memory 117. When the print data of a predetermined amount, for instance, one page is developed into a bit pattern, the clock generator 118 sets the image clocks on the basis of the present dot density stored in the DDS memory area and designates the printing dot density into the printing section 104. A print start instruction and a vertical sync signal are output to the printing section 104.

When the vertical sync signal is input, the printing section 104 generates a horizontal sync signal by the printing mechanism in the printing section 104 and outputs to the printer interface section 119. The printer interface section 119 reads out the bit image data from the bit map memory 117 synchronously with the horizontal sync signal and converts it into serial signal, which it outputs as the video signal to the printing section 104. The printing section 104 receives the video signal and prints by scanning, for instance, a laser beam or the like. In the case where the control program stored in the ROM 112 or either one of the emulation programs A and B has been selected, the above-described printing operation is controlled in accordance with the selected emulation program.

When a dot density designation command is input, the printing section 104 sets the internal conditions of the printing section 104 so as to change the printing dot density to the designated dot density. After that, the printing is executed at the designated printing dot density.

The fundamental printing operation has been described above. Changing the dot density as a feature of this embodiment will now be described.

In this embodiment, it is now assumed that the emulation programs A and B are connected and that both of the emulation programs differ from the command systems stored in the ROM 112.

When a power source is turned on or a reset command is input from the inputting section 121, the CPU 111 initializes the system on the basis of the program in the ROM 112. At this time, it is recognized that the emulation program has been connected by referring to the ID written in a special address of the emulation program A (in the case where the auxiliary memory is connected) through this system bus 120.

When the execution of the emulation program A123 is indicated from the inputting section 121, on the basis of the ID of the emulation program A, the printing dot density is read and a dot density changing command is output to the printing section 104 so as to change the printing dot density to the designated dot density through the printer interface section 118. At the same time, the clock rate of the clock generator 119 is changed so as to output the image clocks corresponding to the printing dot density in the printing section 104. After that, the control is shifted from the program in the ROM 112 to the emulation program A123 and the printing process is executed.

If information to indicate the printing dot density does not exist in the emulation program, a table to store the printing dot density corresponding to the emulation printer is previously stored in the ROM 112 and the printing dot density is instructed with reference to the table.

On the other hand, in the case where the emulation program A123 is not connected to the outside or the execution of the emulation program B122 has been instructed from the inputting section 121, the printing dot density corresponding to the emulation program is also similarly changed.

FIG. 5 is a flowchart showing the printing process in the embodiment. The control program to execute the printing process is stored in the ROM 112.

The printing process is started by turning on the power source of the apparatus, inputting a reset command from the inputting section 121, or the like. First, in step S1, a check is made to see if the execution of the emulation program has been instructed by the inputting section 121 or not. If NO, step S2 follows and the control program stored in the ROM 112 is executed.

If the execution of the emulation program has been instructed, step S3 follows and a check is made to see if the execution of the auxiliary memory 123 (emulation program A) has been instructed from the inputting section 121 or not. If the execution of the emulation program B122 has been instructed, step S4 follows and the ID of the emulation program B (built-in ROM) is read.

If the execution of the emulation program A in the auxiliary memory 123 has been instructed in step S3, step S5 follows and a check is made to see if the auxiliary memory is connected or not. If NO, step S2 follows and the control program in the ROM 112 is executed. Under the control of the control program, the processes to display an indication of the absence of the auxiliary memory and the like are executed.

If the auxiliary memory is connected in step S5, step S6 follows and the ID of the emulation program A123 in the auxiliary memory is input. Then, step S7 follows and a check is made to see if the printing dot density of the emulation program A or B has been designated or not on the basis of the ID information which was read in step S4 or S5. If the printing dot density has been designated, step S8 follows and the dot density is read and stored in the DDS memory area in the RAM 113. If the information to indicate the dot density does not exist in the emulation program, step S9 follows and the printing dot density is determined with reference to the table (not shown) stored in the ROM 112.

When the printing dot density is determined, step S10 follows and the dot density information is output to the printing section 104 through the printer interface section 119 on the basis of the dot density information stored in the DDS memory area in the RAM 113. Due to this, the printing dot density of the printing section 104 is changed to the indicated value. Then, step S11 follows and an instruction signal to change the clock rate is output to the clock generator 118. Thus, the image clocks according to the printing dot density which was set in the printing section 104 are supplied to the printer interface section 119. The subsequent printing processes are executed synchronously with the image clocks. In step S12, the emulation program indicated is executed and the processing routine is finished.

Since the printing is performed at the printing dot density corresponding to the emulation program which is executed, there is an advantage such that the printing processes can be also executed by using the emulation program of a different printing dot density.

In the above embodiment, all of the emulation programs have been executed from the inputting section 121. However, it is also possible to construct the system in a manner such that the priorities are provided for the auxiliary memories and when the auxiliary memory is connected, its emulation program is executed.

Although this embodiment has been described with respect to the case of emulation programs, the invention is not limited to such a case but even in the case of the control program corresponding to another command system, it can be also similarly executed.

As described above, according to this embodiment, by recognizing the external or internal emulation programs or the like and automatically switching the printing dot density to the densities designated by these programs, the optimum printing dot densities can be set and the printing can be executed without the aid of the operator for the control programs corresponding to various emulation programs or other command systems.

Thus, all of the emulation programs or the like which cannot be executed because of differences of the dot density in the printing section, can be used.

As described above, according to the invention, since the recording dot density can be automatically changed in correspondence to the optimum recording dot density suitable for the control program such as an emulation program or the like, there is an advantage that a disabled state of the program execution and incorrect recording due to the difference of the recording dot density can be avoided.

I claim:

1. An output apparatus for receiving code information, converting the code information into a bit map and recording, said apparatus comprising:
converting means for converting the code information into image information of a bit pattern form;
recording means which can record the image information on a recording medium with a change in output resolution of such image;
changing means for changing dot density with which said recording means records, in correspondence to a code system designated by the code information; and
memory means for storing information indicating a current output resolution.

2. An output apparatus for receiving code information, converting the code information into a bit map and recording, said apparatus comprising:
converting means for converting the code information into image information of a bit pattern form;
recording means which can receive the image information and record the image information on a recording medium and which can record an image on the recording medium with a change in output resolution of such image; and
changing means for changing output resolution with which the recording means records, in correspondence to a control program to execute a recording process using said recording means.

3. An output apparatus comprising:
designating means for manually designating a desired emulation program on the basis of which data is to be output; and
determining means for determining an image output resolution corresponding to the desired emulation program designated via said designating means.

4. An output apparatus comprising:
determining means or determining which one of a plurality of code systems is to be used for outputting data; and
control means for changing a output resolution in response to a determination by said determining means; and
memory means for storing information indicating a current output resolution.

5. An output apparatus comprising:
determining means for determining which one of a plurality of emulation programs is to be used for outputting data; and
control means for changing a output resolution in response to a determination by said determining means.

6. An apparatus according to claim 1 or 2, wherein the code information includes a character code, character size or character style.

7. An apparatus according to claim 1 or 2, further comprising means for controlling a character pitch in response to the code system.

8. An apparatus according to claim 1 or 2, wherein said changing means changes the output resolution by a page unit.

9. An apparatus according to claim 1 or 2, wherein said changing means changes the output resolution by a predetermined job unit.

10. An apparatus according to claim 1 or 2, further comprising means for analyzing the code information for conversion thereof at a time during which the code information is being received.

11. An apparatus according to claim 1 or 2, further comprising means for transferring the image data in parallel.

12. An apparatus according to claim 11, wherein the image data transferred in parallel is converted to serial data by a printer interface.

13. An apparatus according to claim 1 or 2, wherein said changing means changes a period of a clock for image data.

14. An apparatus according to claim 1 or 2, wherein said changing means changes a laser scanning speed or scanning period.

15. An apparatus according to claim 1 or 2, wherein said changing means changes a transportation speed of a recording sheet.

16. An apparatus according to claim 1 or 2, wherein said changing means changes a scanning pitch of a serial printer head or a recording pitch of a recording sheet.

17. An apparatus according to claim 1 or 4, wherein the code system is represented by a page description language.

18. An apparatus according to claim 1 or 4, wherein the code system comprises a group of commands for a variety of printers.

19. An apparatus according to claim 1, 2, 3, 4 or 5, further comprising means for storing dot font data or vector font data representing character data.

20. An apparatus according to claim 2, wherein the control program indicates an English language code system or a Japanese language code system.

21. An apparatus according to claim 2, wherein the control program is represented by a page description language.

22. An apparatus according to claim 2, wherein the control program comprises a group of commands for a variety of printers.

23. An apparatus according to claim 2, 3, or 5, further comprising memory means for storing information indicating a current output resolution.

24. An apparatus according o claim 23, wherein the information is represented in dots per inch.

25. An apparatus according to claim 3, wherein the emulation program is inherently provided in said apparatus.

26. An apparatus according to claim 3, wherein an external memory for storing the emulation program can be detachably attached to said apparatus.

27. An apparatus according to claim 3, wherein the emulation program corresponds to a page description language.

28. An apparatus according to claim 3, wherein the emulation program comprises a group of commands for a variety of printers.

29. An apparatus according to claim 3, wherein said determining means determines the resolution by a page unit.

30. An apparatus according to claim 3, wherein said determining means determines the resolution by a predetermined job unit.

31. An apparatus according to claim 3, further comprising means for analyzing data at a time during which the data is being received from a host computer.

32. An apparatus according to claim 3, further comprising means for transferring an image data in parallel for output thereof.

33. An apparatus according to claim 32, wherein the image data transferred in parallel is converted to serial data by a printer interface.

34. An apparatus according to claim 3, further comprising means for storing resolution information for respective emulation program.

35. An apparatus according to claim 3, wherein the emulation program includes information indicating a corresponding resolution.

36. An apparatus according to claim 3, wherein priority is given to an emulation program stored in an external memory other than an emulation program inherently provided in said apparatus.

37. An apparatus according to claim 3, wherein said emulation program changes a period of a clock for image data.

38. An apparatus according to claim 3, wherein said emulation program changes a laser scanning speed or scanning period.

39. An apparatus according to claim 3, wherein said emulation program changes a transportation speed of a recording sheet.

40. An apparatus according to claim 3, wherein said control means changes a transportation speed of a recording sheet.

41. An apparatus according to claim 4, further comprising means for transferring image data in parallel.

42. An apparatus according to claim 41, wherein the data transferred in parallel is converted to serial data by a printer interface.

43. An apparatus according to claim 4, wherein said control means changes the dot density by a page unit.

44. An apparatus according to claim 4, wherein said control means changes the output resolution by a predetermined job unit.

45. An apparatus according to claim 4 or 5, wherein said control means changes a period of a clock for image data.

46. An apparatus according to claim 4 or 5, wherein said control means changes a laser scanning speed or scanning period.

47. An apparatus according to claim 4 or 5, wherein said emulation program changes a scanning pitch of a serial printer head or a recording pitch of a recording sheet.

48. An apparatus according to claim 4 or 5, wherein said control means changes a scanning pitch of a serial printer head or a recording pitch of a recording sheet.

49. An output method for receiving code information, converting the code information into a bit map and recording, comprising the steps of:
    converting the code information into the image information of a bit pattern form; and
    recording the image information on a recording medium, wherein said recording step comprises the step of changing the output resolution with which the image information is to be recorded, in correspondence to a code system designated by the code information.

50. An output method, for receiving code information, converting the code into a bit map and recording, comprising the steps of:
    converting the code information into image information of a bit pattern form; and
    recording the image information on a recording medium, wherein said recording step comprises the step of changing a output resolution to be used in said recording step in correspondence to a control program to execute a recording process.

51. An output method comprising the steps of:
    manually designating a desired emulation program on the basis of which data is output; and
    determining an image output resolution corresponding to the desired emulation program designated in said designating step.

52. An output method comprising the steps of:
    determining which one of a plurality of code systems is to be used for outputting data;
    changing a output resolution in response to a determination in said determining step; and
    storing information indicating a current output resolution.

53. An output method comprising the step of:
    determining which one of a plurality of emulation programs is to be used for outputting data; and
    changing a recording dot density in response to a determination in said determining step.

54. An output method according to claim 49, wherein the code system indicates an English language code system or a Japanese language code system.

55. An output method according to claim 49 or 5, wherein the code information includes a character code, character size or character style.

56. An output method according to claim 49 or 50, further comprising controlling a character pitch in response to the code system.

57. An output method according to claim 49 or 50, further comprising analyzing the code information for conversion thereof at a time during which the code information is being received.

58. An output method according to claim 49 or 50, further comprising transferring the image data in parallel.

59. An output method according to claim 58, wherein the image data transferred in parallel is converted to serial data by a printer interface.

60. An output method according to claim 49 or 52, wherein the code system is represented by a page description language.

61. An output method according to claim 49 or 52, wherein the code system comprises a group of commands for a variety of printers.

62. An output method according to claim 49, 50 or 52, further comprising changing the dot density by a page unit.

63. An output method according to claim 49, 50 or 52, further comprising changing the output resolution by a predetermined job unit.

64. An output method according to claim 49, 50, 51, or 53, further comprising storing information indicating a current output resolution.

65. An output method according to claim 64, wherein the information is represented in dots per inch.

66. An output method according to claim 49, 50, 51 or 53, further comprising changing a period of a clock for image data.

67. An output method according to claim 49, 52 or 53, further comprising changing a laser scanning speed or scanning period.

68. An output method according to claim 49, 50, 52 or 53, further comprising changing a transportation speed of a recording sheet.

69. An output method according to claim 49, 52 or 53, further comprising changing a scanning pitch of a serial printer head or a recording pitch of a recording sheet.

70. An output method according to claim 50, wherein the code information indicates an English language code information or a Japanese language code information.

71. An output method according to claim 50, wherein the code information is represented by a page description language.

72. An output method according to claim 51, wherein the emulation program corresponds to a page description language.

73. An output method according to claim 51, wherein the emulation program comprises a group of commands for a variety of printers.

74. An output method according to claim 51, wherein said determining step determines the resolution by a page unit.

75. An output method according to claim 51, wherein said determining step determines the resolution by a predetermined job unit.

76. An output method according to claim 51, further comprising analyzing data at a time during which the data is being received from a host computer.

77. An output method according to claim 51, further comprising transferring an image data in parallel for output thereof.

78. An output method according to claim 77, wherein the image data transferred in parallel is converted to serial data by a printer interface.

79. An output method according to claim 51, wherein the emulation program includes information indicating a corresponding resolution.

80. An output method according to claim 51, wherein priority is given to an emulation program stored in an external memory other than an emulation program inherently provided in said apparatus.

81. An output method according to claim 52, further comprising transferring data in parallel.

82. An output method according to claim 81, wherein the data transferred in parallel is converted to serial data by a printer interface.

83. An apparatus for receiving code information, converting the code information into a bit map and recording, said apparatus comprising:
   converting means for converting the code information into image information of a bit pattern form;
   recording means which can record the image information on a recording medium with a change in output resolution of such image; and
   changing means for changing dot density with which said recording means records, in correspondence to a code system designated by the code information,
   wherein the code system indicates an English language code system or a Japanese language code system.

84. An output apparatus comprising:
   determining means for determining which one of a plurality of code systems is to be used for outputting data; and
   control mans for changing a output resolution in response to a determination by said determining means,
   wherein the code system indicates an English language code system or a Japanese language code system.

85. An output method comprising the steps of:
   determining which one of a plurality of code systems is to be used for outputting data; and
   changing a a output resolution in response to a determination in said determining step,
   wherein the code system indicates an English language code system or a Japanese language code system.

* * * * *

UNITED STATES PATENT AND TRADEMARK OFFICE
CERTIFICATE OF CORRECTION

PATENT NO. : 5,355,231
DATED : October 11, 1994
INVENTOR(S) : MASAHIKO MURATA

It is certified that error appears in the above-identified patent and that said Letters Patent is hereby corrected as shown below:

ON TITLE PAGE

In [57] ABSTRACT:
  Line 4, "form" should read --form,--.
  Line 7, "a the" should read --the--.

COLUMN 1

Line 11, "of the" should read --of data--.
  Line 12, "into" should be deleted.
  Line 26, "Japanese" should read --Japanese,--.
  Line 37, "print" should read --printing--.

COLUMN 2

Line 1, "it is" should be deleted.
  Line 14, "example" should read --example,-- and "it is" should be deleted.
  Line 21, "has" should read --by--.
  Line 66, "embodiment" should read --embodiments--.

COLUMN 3

Line 8, "their" should read --this--.
  Line 37, "the executing" should read --for executing--.

COLUMN 5

Line 21, "be also" should read --also be--.
  Line 39, "Which" should read --which--.
  Line 59, "the the" should read --the--.
  Line 60, "Values of" should read --values of the--.

UNITED STATES PATENT AND TRADEMARK OFFICE
CERTIFICATE OF CORRECTION

PATENT NO. : 5,355,231
DATED : October 11, 1994
INVENTOR(S) : MASAHIKO MURATA

It is certified that error appears in the above-identified patent and that said Letters Patent is hereby corrected as shown below:

COLUMN 6

Line 22, "the above" should read --In the above--.

COLUMN 9

Line 3, "one" should be deleted.
Line 54, "the embodiment." should read --this embodiment.--.

COLUMN 11

Line 15, "dot density" should read --output resolution--.
Line 28, "medium" should read --medium,--.
Line 44, "or" should read --for--.
Line 47, "a" should read --an--.
Line 56, "a" should read --an--.

COLUMN 12

Line 48, "o" should read --to--.

COLUMN 13

Line 11, "for" (second occurrence) should read --for a--.
Line 38, "dot density" should read --output resolution--.
Line 66, "method," should read --method--.
Line 67, "code" should read --code information--.

UNITED STATES PATENT AND TRADEMARK OFFICE
CERTIFICATE OF CORRECTION

PATENT NO. : 5,355,231
DATED : October 11, 1994
INVENTOR(S) : MASAHIKO MURATA

It is certified that error appears in the above-identified patent and that said Letters Patent is hereby corrected as shown below:

COLUMN 14

Line 5, "a" should read --an--.
    Line 17, "a" (first occurrence) should read --an--.
    Line 24, "a recording dot density" should read
        --an output resolution--.
    Line 29, "claim 49 or 5," should read --claim 49 or 50,--.
    Line 52, "dot density" should read --output resolution--.
    Line 63, "claim 49, 50, 51 or" should read
        --any of claims 49-53,--.
    Line 64, "53," should be deleted.
    Line 66, "claim 49, 52, or 53," should read
        --any of claims 49-53,--.

COLUMN 15

Line 1, "claim 49, 50, 52 or" should read
        --any of claims 49-53,--.
    Line 2, "53," should be deleted.
    Line 4, "claim 49, 52 or 53," should read
        --any of claims 49-53,--.

COLUMN 16

Line 16, "dot density" should read --output resolution--.
    Line 27, "mans" should read --means-- and
        "a" should read --an--.

UNITED STATES PATENT AND TRADEMARK OFFICE
CERTIFICATE OF CORRECTION

PATENT NO. : 5,355,231
DATED : October 11, 1994
INVENTOR(S) : MASAHIKO MURATA

It is certified that error appears in the above-identified patent and that said Letters Patent is hereby corrected as shown below:

COLUMN 16

Line 36, "a a" should read --an--.

Signed and Sealed this

Twenty-first Day of March, 1995

Attest:

BRUCE LEHMAN

Attesting Officer     Commissioner of Patents and Trademarks